US012786773B2

(12) United States Patent
Tao

(10) Patent No.: US 12,786,773 B2
(45) Date of Patent: Nov. 3, 2026

(54) METHOD AND APPARATUS FOR SENDING AND RECEIVING MEASUREMENT GAP CONFIGURATION INFORMATION

(71) Applicant: Beijing Xiaomi Mobile Software Co., Ltd., Beijing (CN)

(72) Inventor: Xuhua Tao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 312 days.

(21) Appl. No.: 18/695,222

(22) PCT Filed: Sep. 29, 2021

(86) PCT No.: PCT/CN2021/121863
§ 371 (c)(1),
(2) Date: Mar. 25, 2024

(87) PCT Pub. No.: WO2023/050202
PCT Pub. Date: Apr. 6, 2023

(65) Prior Publication Data

US 2024/0406774 A1 Dec. 5, 2024

(51) Int. Cl.
*H04W 24/10* (2009.01)
*H04L 5/00* (2006.01)
*H04W 68/02* (2009.01)
*H04W 76/20* (2018.01)

(52) U.S. Cl.
CPC ........... *H04W 24/10* (2013.01); *H04L 5/0051* (2013.01); *H04W 68/02* (2013.01); *H04W 76/20* (2018.02)

(58) Field of Classification Search
CPC ..... H04W 24/10; H04W 68/02; H04W 76/20; H04W 88/06; H04W 36/14; H04W 36/0088; H04W 72/231; H04W 24/08; H04W 72/21; H04L 5/0051
See application file for complete search history.

(56) References Cited

U.S. PATENT DOCUMENTS

| | | | | |
|---|---|---|---|---|
| 2020/0351818 | A1 | 11/2020 | Park et al. | |
| 2021/0337612 | A1* | 10/2021 | Yang | H04W 76/30 |
| 2023/0048297 | A1* | 2/2023 | Lee | H04W 24/08 |
| 2023/0337035 | A1* | 10/2023 | Cao | H04W 24/10 |

(Continued)

FOREIGN PATENT DOCUMENTS

| | | | |
|---|---|---|---|
| CN | 111556521 | A | 8/2020 |
| CN | 112020108 | A | 12/2020 |

OTHER PUBLICATIONS

U.S. Appl. No. 63/260,049, Lee et al, Aug. 6, 2021 (Year: 2021).*

(Continued)

*Primary Examiner* — Afshawn M Towfighi
(74) *Attorney, Agent, or Firm* — Finnegan, Henderson, Farabow, Garrett & Dunner, L.L.P.

(57) ABSTRACT

A method for receiving measurement gap configuration information is executed by user equipment, and includes: sending auxiliary information to a network device of a service network, wherein the auxiliary information is configured to indicate at least one parameter for the user equipment to switch from the service network to a target network; and receiving first measurement gap configuration information determined by the network device according to the auxiliary information.

18 Claims, 3 Drawing Sheets

(56) References Cited

U.S. PATENT DOCUMENTS

2026/0075567 A1* 3/2026 Mohammed Mikaeil Salih ......... G01S 5/0278

OTHER PUBLICATIONS

"Analysis on UE switching without leaving RRC_CONNECTED state", China Telecom, 3GPP TSG-RAN WG2 Meeting #114e, R2-2105196, Electronic, May 19-27, 2021, 3 pages.
"RAN4 TU requirements for R17 Musim Switching Gaps", Apple, 3GPP TSG RAN Meeting #93-e, RP-212355, Electronic Meeting, Sep. 13-17, 2021, 5 pages.
Extended European Search Report Issued in Application No. 21956790.4 dated Oct. 14, 2024, 13 pages.
Notice of Reasons for Refusal issued by the Japanese Patent Office on Dec. 17, 2024, in corresponding Application No. JP 2024-519124, 4 pages.
Office Action issued by the Patent Office of the Russian Federation Federal Institute of Industrial Property on Oct. 28, 2024, in corresponding Application No. RU 2024111154/07, 8 pages.
International Search Report and Written Opinion of International Application No. PCT/CN2021/121863, dated Jun. 24, 2022, 14 pages.
ZTE Corporation, Sanechips, "Report for [Post114-e][243][MUSIM] Gap handling," 3GPP TSG-RAN WG2 Meeting #115-e, R2-2108077, Electronic Meeting, 16th-17th, 2021, 58 pages.
"Switching notification procedure for basic switching scenarios for Single RX UE", Nokia, Nokia Shanghai Bell, 3GPP TSG-RAN WG2 #114 Electronic, R2-2105226, Elbonia, May 19-27, 2021, 5 pages.
Office Action issued by the Intellectual Property Office of Singapore on Feb. 6, 2026, in corresponding SG Application No. 11202402091W, 11 pages.

* cited by examiner

METHOD AND APPARATUS FOR SENDING AND RECEIVING MEASUREMENT GAP CONFIGURATION INFORMATION

CROSS-REFERENCE TO RELATED APPLICATION

This application is a U.S. national stage application of International Application No. PCT/CN2021/121863, filed on Sep. 29, 2021, the entire content of which is incorporated herein by reference.

FIELD

The present disclosure relates to the technical field of wireless communication and, more particularly, to a method and apparatus for receiving measurement gap configuration information, a method and apparatus for sending measurement gap configuration information, and a medium.

BACKGROUND

During communication between multi-card user equipment (UE) and network devices, multi-card UE may switch between different service networks.

When the multi-card UE switches from a service network to a target network for cell and neighboring cell measurements under the target network, it will cause service interruption under the service network and affect communication quality of the multi-card UE.

How to ameliorate the service interruption during the switching process of the multi-card UE between different networks is a problem that needs to be solved.

SUMMARY

A first aspect of embodiments of the present disclosure provides a method for receiving measurement gap configuration information. The method is executed by user equipment. The method includes: sending auxiliary information to a network device of a service network, in which the auxiliary information is configured to indicate at least one parameter for the user equipment to switch from the service network to a target network: and receiving first measurement gap configuration information determined by the network device according to the auxiliary information.

A second aspect of embodiments of the present disclosure provides a method for sending measurement gap configuration information. The method is executed by a network device. The method includes: receiving auxiliary information sent by user equipment, in which the auxiliary information is configured to indicate at least one parameter for the user equipment to switch from a service network to a target network: determining first measurement gap configuration information according to the auxiliary information: and sending the first measurement gap configuration information to the user equipment.

A third aspect of embodiments of the present disclosure provides user equipment, including a processor and a memory storing a computer program executable by the processor. The processor is configured to: send auxiliary information to a network device of a service network, in which the auxiliary information is configured to indicate at least one parameter for the user equipment to switch from the service network to a target network: and receive first measurement gap configuration information determined by the network device according to the auxiliary information.

BRIEF DESCRIPTION OF DRAWINGS

Drawings illustrated here are used to provide a further understanding of embodiments of the present disclosure and constitute a part of the present disclosure. Examples of the embodiments of the present disclosure and relevant descriptions are used to explain the embodiments of the present disclosure and do not constitute improper limitations on the embodiments of the present disclosure.

The drawings, which are incorporated into the specification and constitute a part of the specification, show examples that comply with the embodiments of the present disclosure, and are used to explain the principles of the embodiments of the present disclosure together with the specification.

FIG. 2 shows a flowchart of a method for transmitting measurement gap configuration information according to an embodiment of the present disclosure.

DETAILED DESCRIPTION

Embodiments of the present disclosure are further explained in conjunction with the accompanying drawings and specific implementations.

Embodiments are described in detail here, and examples are shown in the accompanying drawings. The following description refers to the accompanying drawings in which the same numbers in different drawings represent the same or similar elements unless otherwise represented. The implementations set forth in the following description of the embodiments do not represent all implementations consistent with the embodiments of the present disclosure. Instead, they are merely examples of devices and methods consistent with some aspects of the present disclosure.

Figure 1:
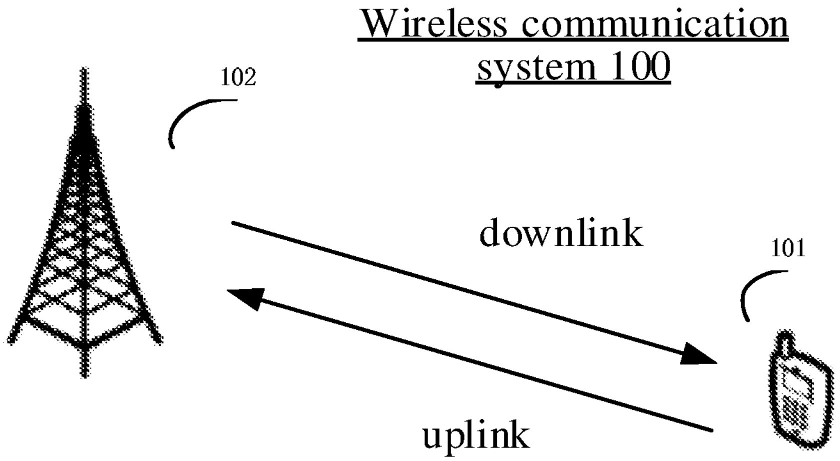
FIG. 1 is a schematic diagram of a wireless communication system architecture according to embodiments of the present disclosure.

As shown in FIG. 1, a method for transmitting measurement gap configuration information according to embodiments of the present disclosure is applied to a wireless communication system 100, and the wireless communication system includes user equipment 101 and a network device 102. The user equipment 101 is configured to support carrier aggregation, and the user equipment 101 is coupled to a plurality of carrier units (including one primary carrier unit and one or more auxiliary carrier units) of the network device 102.

It should be understood that the wireless communication system 100 may be applied to both low-frequency scenarios and high-frequency scenarios. The application scenarios of wireless communication system 100 include, but are not limited to, long-term evolution (LTE) systems, LTE frequency division duplex (FDD) systems, LTE time division duplex (TDD) systems, worldwide interoperability for micro wave access (WiMAX) communication systems, cloud radio access network (CRAN) systems, future 5th-Generation (5G) systems, new radio (NR) communication systems, or future evolved public land mobile network (PLMN) systems, etc.

The user equipment 101 shown above may be user equipment (UE), a terminal, an access terminal, a terminal unit, a terminal station, a mobile station (MS), a remote station, a remote terminal, a mobile terminal, a wireless communication apparatus, a terminal agent, or a user device, etc. The user equipment 101 may have a wireless sending and receiving function, and may communicate with one or more network devices of one or more communication systems (such as wireless communication) and accept network services provided by the network devices that include but are not limited to the network device 102 as illustrated.

The user equipment 101 may be cellular phones, cordless phones, session initiation protocol (SIP) phones, wireless local loop (WLL) stations, personal digital assistant (PDA) devices, handheld devices with wireless communication function, computing devices or other processing devices coupled to wireless modems, in-vehicle devices, wearable devices, user equipment in future 5G networks, or user equipment in future evolved PLMN networks, etc.

The network device 102 may be an access network device (or known as an access site point). The access network device refers to devices providing network access functions, such as radio access network (RAN) base stations, and so on. The network device 102 may specifically include a base station (BS), or a wireless resource management device including the base station and configured to control the base station. The network device 102 may also include relay stations (relay devices), access points, and base stations in future 5G networks, base stations in future evolved PLMN networks, or NR base stations, etc. The network device 102 may be wearable devices or in-vehicle devices. The network device 102 may also be a communication chip with a communication module.

For example, the network device 102 includes but is not limited to: a next-generation node B (gnodeB, gNB) in 5G, an evolved node B (eNB) in LTE systems, a radio network controller (RNC), a node B (NB) in WCDMA systems, a wireless controller in CRAN systems, a base station controller (BSC), a base transceiver station (BTS) in GSM systems or in CDMA systems, a home evolved nodeB or a home node B (HNB), a baseband unit (BBU), a transmission and receiving point (TRP), a transmission point (TP), or a mobile switching center, etc.

Embodiments of the present disclosure provide a method for transmitting measurement gap configuration information. FIG. 2 shows a flowchart of the method for transmitting measurement gap configuration information according to an embodiment of the present disclosure. As shown in FIG. 2, the method includes the following steps.

In step S21, the user equipment 101 sends auxiliary information to the network device 102 of a service network, in which the auxiliary information is configured to indicate at least one parameter for the user equipment 101 to switch from the service network to a target network.

In step S22, the network device 102 receives the auxiliary information sent by the user equipment 101, in which the auxiliary information is configured to determine at least one parameter for the UE to switch from the service network to the target network.

In step S23, the network device 102 determines first measurement gap configuration information according to the auxiliary information.

In step S24, the network device 102 sends the first measurement gap configuration information to the user equipment 101.

In step S25, the user equipment 101 receives the first measurement gap configuration information sent by the network device 102, in which the first measurement gap configuration information is determined by the network device according to the auxiliary information.

In the embodiments of the present disclosure, the user equipment 101 reports relevant parameters for switching from the service network to the target network, and the network device 102 determines the first measurement gap configuration information according to the relevant parameters for the service network switching. According to the first measurement gap configuration information, the network device indicates the time for measuring the relevant parameters during the switching of the user equipment 101 from the service network to the target network, such that the user equipment 101 may perform relevant parameter measurement and service transmission of the service network at different times, ameliorating the problem of service interruption during the service network switching process.

In this method, according to the relevant parameters for switching from the service network to the target network reported by the user equipment 101, the network device 102 determines the corresponding first measurement gap configuration information, to accurately indicate the time for parameter measurement during the service network switching process of the user equipment 101, such that, during the service network switching process, the user equipment 101 may perform service transmission of the service network appropriately and effectively at a non-parameter-measurement time, ameliorating the problem of service interruption during the process of network switching.

In an embodiment, this parameter may be the first measurement gap configuration information recommended by the user device 101. In another embodiment, the parameter may also be one or more parameters capable of assisting the network device 102 in determining the first measurement gap configuration information. In this way, the network device 102 may determine the first measurement gap configuration information according to the communication protocol and one or more parameters reported by the user equipment 101: or the network device 102 may determine the first measurement gap configuration information according to one or more parameters reported by the user equipment 101.

It should be noted that the above embodiments include the user equipment 101 and the network device 102: and the steps to be executed by the user equipment 101 and the network device 102 may refer to the description of any one of the following embodiments, which are not repeated herein.

Embodiments of the present disclosure provide a method for receiving measurement gap configuration information. This method is executed by the user equipment 101. This method includes the following steps.

In step S1-1, the user equipment 101 sends auxiliary information to the network device 102, in which the auxiliary information is configured to indicate at least one parameter for the user equipment 101 to switch from the service network to the target network.

In step S1-2, the user equipment 101 receives the first measurement gap configuration information sent by the network device 102, in which the first measurement gap configuration information is determined by the network device 102 according to the auxiliary information.

In some embodiments, the measurement of the same frequency target cell of the service cell does not affect the service data transmission of the user equipment 101 under the service network. When the target cell and the service cell are not on the same frequency, the user equipment 101 needs to suspend service communication with the service network during the process of the user equipment 101 switching from the service network to the target network. The time when service communication with the service network is suspended and measurement operations related to the target cell under the target network are performed is a measurement gap (Meas Gap).

The first measurement gap configuration information may indicate the relevant information of the measurement gap (Meas Gap) corresponding to the user equipment 101. For example, the first measurement gap configuration information may include at least one of: start time, end time, or duration. The start time or the end time may each be a time offset relative to a current time point or a preset time point. In an embodiment, the first measurement gap configuration information may include the start time and the duration: or may include the start time and the end time: or may include the end time and the duration: or may include only the start time: or may include only the end time: or may include only the duration. During the duration of the indicated measurement gap (Meas Gap), the user equipment 101 may measure the target cells in the target network, and the network device 102 of the service network does not schedule service data to the user equipment 101 during the duration of the measurement gap, effectively ameliorating the problem of service interruption during network switching.

In some embodiments, during the process of the user equipment 101 switching from the service network to the target network may involve one of the following measurement operations: heterogeneous frequency measurement, heterogeneous system measurement, system information (SI) or paging information (paging) reception, etc.

In an example, the auxiliary information is configured to indicate a usage of the measurement gap (Meas Gap), i.e., to perform the specific measurement operation mentioned above.

In an example, the auxiliary information is configured to indicate at least one of the following parameters: an identification (ID) of the measurement gap (Meas Gap), configured to identify the corresponding auxiliary information, in which, for example, each auxiliary information corresponds to a Meas Gap ID: a type of the measurement gap (Meas Gap) configured to indicate whether the gap in the corresponding auxiliary information is periodic or non-periodic, in which the periodic measurement gap (Gap) may be cyclically used according to a certain period, and the non-periodic measurement gap (Gap) may be released after one use: timing difference of the measurement gap (Meas Gap): a usage of the measurement gap (Meas Gap), each auxiliary information indicating a measurement use or purpose corresponding to the measurement gap, such as performing cell measurements (cross frequency measurements or cross system measurements), receiving system information (SI) or paging information, or receiving or sending service data of the target network: or effectiveness information of the measurement gap (Meas Gap), for example, to indicate effective duration or the number of effective uses of the gap in the corresponding auxiliary information.

In an example, the auxiliary information may include multiple sets of information, each set of information contains the same parameters, and each set of information corresponds to a unique group identification.

In the embodiments of the present disclosure, the user equipment 101 reports the auxiliary information, so that the network device 102 determines the more accurate first measurement gap configuration information according to the auxiliary information: the user equipment 101, based on the first measurement gap configuration information, performs measurement operations related to the target network at an appropriate measurement gap, and may perform the service transmission of the service network at another appropriate time, effectively ameliorating the problem of service interruption during network switching.

The method in the above embodiments further includes: sending a radio resource control signaling to the network device 102 of the service network, in which the radio resource control signaling includes the auxiliary information.

In the embodiments of the present disclosure, the user equipment 101 reports the auxiliary information to the network device 102 through the radio resource control (RRC) signaling.

Embodiments of the present disclosure provide a method for receiving measurement gap configuration information. This method is executed by the user equipment 101. This method further includes the following steps.

In step S1-1', the user equipment 101 sends auxiliary information and second measurement gap configuration information to the network device 102 of a service network, in which the auxiliary information is configured to indicate at least one parameter for the user equipment 101 to switch from the service network to the target network.

In step S1-2', the user equipment 101 receives the first measurement gap configuration information sent by the network device 102, in which the first measurement gap configuration information is determined by the network device 102 of the service network according to the auxiliary information and the second measurement gap configuration information.

The second measurement gap configuration information is configured to indicate the measurement gap configuration information requested by the user equipment 101 to the network device 102. The second measurement gap configuration information may include at least one of: the start time (gap offset), the end time, or the duration (gap duration). Alternatively, the second measurement gap configuration information may include at least one of: the start time of the measurement gap (gap offset), the duration of the measurement gap (gap duration), or the period of the measurement gap (gap period). The start time or the end time may each be a time offset relative to the current time point or the preset time point.

In an embodiment, the duration of the measurement gap (gap duration) indicates the duration of the measurement gap requested by the user equipment 101. For example, in response to the target network being a new radio network, the duration of the measurement gap is a maximum value of the synchronous signal measurement time configuration SMTC, or a maximum value of the reference signal measurement time configuration CMTC. Alternatively, in response to the target network being a long-term evolution network, the duration of the measurement gap is the duration of the cell reference signal.

In an example, the target network is a 5G new radio (NR) network, and the gap duration required for the user equipment 101 to perform 5G NR signal measurement may be the maximum value of SMTC (SMTC_max). SMTC_max is the maximum value of SMTC configured in the target cell corresponding to all target carriers in 5G NR.

In an example, the target network is the 5G new radio (NR) network, and the gap duration required for the user equipment 101 to perform 5G NR signal measurement may be the maximum value of CMTC (CMTC_max). CMTC_max is the maximum value of CMTC configured in the target cell corresponding to all target carriers in 5G NR.

In an example, the target network is a Long-term evolution Network (LTE), and the gap duration required for the user equipment 101 to perform LTE signal measurement may be the duration of the reference signal of the target cell.

In an embodiment, the network device 102 determines the first measurement gap configuration information according to the auxiliary information and the second measurement gap configuration information requested by the user equipment 101, and the gap duration in the first measurement gap configuration information is not greater than the gap duration in the second measurement gap configuration information.

In the embodiments of the present disclosure, the network device 102 combines the auxiliary information and the second measurement gap configuration information requested by the user equipment 101 to determine the first measurement gap configuration information, more accurately determining the first measurement gap configuration information, and acquisition of a more suitable measurement gap by the user equipment 101.

Embodiments of the present disclosure provide a method for receiving measurement gap configuration information. This method is executed by the user equipment 101. This method includes step 1-1 and step 1-2, or includes step 1-1' and step 1-2'. In this method, the auxiliary information includes first information, in which the first information is configured to indicate a timing difference between the service cell in the service network and the target cell in the target network.

In some embodiments, the network device 102 needs to obtain the timing difference when determining the first measurement gap configuration information. The timing difference may represent a maximum timing difference (deltaT_max) between the reference timing service cell in the service network and the target cell in the target network, which may be a timing difference between a system frame number (SFN) and a frame, called SFN and Frame boundary Timing Difference (SFTD).

In an example, after obtaining the first information, the network device 102 configures the measurement gap according to the first information, which ensures that the user equipment 101 can effectively measure the target cell when measuring the target cell of the target network in the configured gap, avoiding a potential problem that the target cell may not be measured.

In an example, the auxiliary information is the first information, and the first information corresponds to a time difference of t1−n, in which n=1 or 2.

Embodiments of the present disclosure provide a method for receiving measurement gap configuration information. This method is executed by the user equipment 101. This method includes step 1-1 and step 1-2, or includes step 1-1' and step 1-2'. In this method, the auxiliary information includes the first information and second information. The first information is configured to indicate the timing difference between the service cell in the service network and the target cell in the target network: and the second information is configured to indicate the type of the measurement gap (Meas Gap), the type being a periodic type or a non-periodic type.

In an embodiment, in response to that the type indicated by the second information is the periodic type, a period of the measurement gap in the first measurement gap configuration information as an integer multiple of a maximum value of a SMTC period of a target carrier in the target network or as an integer multiple of a maximum value of a CMTC period of the target carrier in the target network.

In some embodiments, when the type of the measurement gap is the periodic type, the second measurement gap configuration information further includes the period of the measurement gap (gap period). The first measurement gap configuration information determined by the network device 102 according to the second measurement gap configuration information and the auxiliary information also includes the period of the measurement gap (gap period).

In an example, the measurement gap period is T_gap, the maximum value of SMTC period is T_SMTC_max, and the maximum value of CMTC period is T_CMTC_max. T_gap satisfies: T_gap=N*T_SMTC_max, or T_gap=N*T_CMTC_max, in which N is an integer.

In an example, the auxiliary information is B1 that includes the first information and the second information. The first information corresponds to a timing difference of t2, and the second information corresponds to the type of the measurement gap being the periodic type.

In an example, the auxiliary information is B2 that includes the first information and the second information. The first information corresponds to a timing difference of t2, and the second information corresponds to the type of the measurement gap being the non-periodic type.

Embodiments of the present disclosure provide a method for receiving measurement gap configuration information. This method is executed by the user equipment 101. This method includes step S1-1 and step S1-2, or includes step S1-1' and step S1-2'. In this method, the auxiliary information includes the first information, the second information, and third information. The third information is configured to indicate the usage of the measurement gap. The usage includes one of: receiving system information or paging information of the target network, performing cell measurement in the target network, and performing data transmission with the target network.

In an example, the third information occupies 2 bits.

When a value of the third information is 0, it corresponds to the first usage, i.e., to receive system information or paging information of the target network:

When the value of the third information is 1, it corresponds to the second usage, i.e., to perform cell measurement in the target network:

When the value of the third information is 2, it performs data transmission with the target network.

In this method, when the third information in the auxiliary information corresponds to different usages, the duration of the measurement gap (gap duration) in the first measurement gap configuration information is different.

In an example, the auxiliary information is C1 that includes the first information, the second information, and the third information. The first information corresponds to a timing difference being t3−1, the second information corresponds to the type of the measurement gap being non-periodic, and the third information corresponds to the usage of the measurement gap being cell measurement with a measurement gap duration of d1.

In an example, the auxiliary information is C2 that includes the first information, the second information, and the third information. The first information corresponds to a timing difference being t3−2, the second information corresponds to the type of the measurement gap being non-periodic, and the third information corresponds to the usage of the measurement gap being cell measurement with a measurement gap duration of d2, in which d2 is different from d1. Embodiments of the present disclosure provide a method for receiving measurement gap configuration information. This method is executed by the user equipment 101. This method includes step S1-1 and step S1-2, or includes step S1-1' and step S1-2'. In this method, the auxiliary information includes the first information, the second information, the third information, and fourth information. The fourth information is configured to indicate a validity period of the measurement gap.

In an embodiment, this method further includes: sending activation information or deactivation information to the network device during the validity period. The activation information is configured to indicate that the first measurement gap configuration information is enabled, while the deactivation information is configured to indicate that the first measurement gap configuration information is not enabled.

In some embodiments, during the validity period, the network device 102 activates the first measurement gap configuration information according to the activation information so that the first measurement gap configuration information is valid. Alternatively, the network device 102 invalidates the first measurement gap configuration information according to the deactivation information.

In some embodiments, the user equipment 101 may send the activation information or the deactivation information to the network device 102 through a radio resource control (RRC) signaling, a media access control (MAC) signaling, or an uplink control information (UCI) signaling, etc.

In an example, the auxiliary information is D that includes the first information, the second information, the third information and the fourth information. The first information corresponds to the timing difference being t4. The second information corresponds to the type of the measurement gap being periodic. The third information corresponds to the usage of the measurement gap being receiving system information or paging information. The fourth information corresponds to the validity period of the measurement gap being L, and the activation information or the deactivation information can be sent during the validity period L.

In some embodiments, after sending the deactivation information and before sending the activation information, at least one of the following actions is performed: receiving data from the network device: or sending data to the network device.

In some embodiments, after sending the deactivation information and before sending the activation information, the user equipment 101 performs service transmission with the service cell under the service network, such as sending and receiving service data normally.

In the embodiments of the present disclosure, the user equipment 101 controls whether the first measurement gap configuration information is valid by sending the activation information or the deactivation information.

Embodiments of the present disclosure provide a method for receiving measurement gap configuration information. This method is executed by the user equipment 101. This method includes step S1-1 and step S1-2, or includes step S1-1' and step S1-2'. This method further includes: releasing the first measurement gap configuration information when a timer expires, in which a start time of the timer is a moment when the first measurement gap configuration information is used for the first time.

In some embodiments, the timer is configured to monitor effective duration of the first measurement gap configuration information, and when the timer expires, the user equipment 101 releases or discards the first measurement gap configuration information.

In an example, timing is configured by the timer, and when the timer expires, the user equipment 101 releases the first measurement gap configuration information.

Embodiments of the present disclosure provide a method for receiving measurement gap configuration information. This method is executed by the user equipment 101. This method includes step S1-1 and step S1-2, or includes step S1-1' and step S1-2'. This method further includes: releasing the first measurement gap configuration information when the number of times the first measurement gap configuration information is used reaches a preset number of times.

In some embodiments, a repetition factor of the first measurement gap configuration information is represented by the preset number of times, and a validity parameter of the first measurement gap configuration information includes the preset number of times of the first measurement gap configuration information.

In an example, the preset number of times is N, and when the number of times the first measurement gap configuration information is used is N, the user equipment 101 releases the first measurement gap configuration information.

Embodiments of the present disclosure provide a method for sending measurement gap configuration information. This method is executed by the network device 102. This method includes the following steps.

In step S2-1, the network device 102 receives the auxiliary information sent by the user equipment 101, in which the auxiliary information is configured to indicate at least one parameter for the user equipment 101 to switch from the service network corresponding to the network device 102 to the target network.

In step S2-2, the network device 102 determines the first measurement gap configuration information according to the auxiliary information.

In step S2-3, the network device 102 sends the first measurement gap configuration information to the user equipment 101.

In the embodiments of the present disclosure, the network device 102 receives the auxiliary information from the user equipment 101 to more accurately determine the first measurement gap configuration information according to the auxiliary information, so that the user equipment 101, based on the first measurement gap configuration information, performs measurement operations related to the target network at an appropriate measurement gap, and perform the service transmission of the service network at another appropriate time, effectively ameliorating the problem of service interruption during network switching.

In some embodiments, step S2-1 that the network device 102 receives the auxiliary information sent by the user equipment 101 further includes: receiving a radio resource control signaling, in which the radio resource control signaling includes the auxiliary information sent by the user equipment 101.

In the embodiments of the present disclosure, the user equipment 101 reports the auxiliary information to the network device 102 through the radio resource control (RRC) signaling.

Embodiments of the present disclosure provide a method for sending measurement gap configuration information. This method is executed by the network device 102. This method includes steps S2-1 to S2-3. This method further includes the following steps.

In step S2-1', the network device 101 receives the auxiliary information and the second measurement gap configuration information sent by the user equipment 101, in which the auxiliary information is configured to indicate at least one parameter for the user equipment 101 to switch from the service network to the target network.

In step S2-2', the network device 102 determines the first measurement gap configuration information according to the auxiliary information and the second measurement gap configuration information.

In step S2-3', the network device 102 sends the first measurement gap configuration information to the user equipment 101.

In the embodiments of the present disclosure, the network device 102 combines the auxiliary information and the second measurement gap configuration information requested by the user equipment 101 to determine the first measurement gap configuration information, more accurately determining the first measurement gap configuration information, and facilitating acquisition of a more suitable measurement gap by the user equipment 101.

Embodiments of the present disclosure provide a method for sending measurement gap configuration information. This method is executed by the network device 102. This method includes steps S2-1 to S2-3, or includes steps S2-1' and S2-3', and the second measurement gap configuration information includes configuration of duration of the measurement gap. This method further includes: setting the duration of the measurement gap as a maximum value of a synchronous signal measurement time configuration SMTC or a maximum value of a reference signal measurement time configuration CMTC, in response to the target network being a new radio network: or setting the duration of the measurement gap as duration of a cell reference signal, in response to the target network being a long-term evolution network.

Embodiments of the present disclosure provide a method for sending measurement gap configuration information. This method is executed by the network device 102. This method includes steps S2-1 to S2-3, or includes steps S2-1' and S-3'. Moreover, the auxiliary information includes at least one of: first information indicating a timing difference between a service cell in the service network and a target cell in the target network: second information indicating a type of a measurement gap, the type being a periodic type or a non-periodic type: third information indicating a usage of the measurement gap, in which the usage includes one of: receiving system information or paging information of the target network, performing cell measurement in the target network, and performing data transmission with the target network: or fourth information indicating a validity period of the measurement gap.

In some embodiments, in step S2-2 of determining the first measurement gap configuration information according to the auxiliary information, a period of the measurement gap in the first measurement gap configuration information is an integer multiple of a maximum value of a SMTC period of a target carrier in the target network or an integer multiple of a maximum value of a CMTC period of the target carrier in the target network, in response to that the auxiliary information includes the second information and the type indicated by the second information is the periodic type.

In some embodiments, in step S2-2 of determining the first measurement gap configuration information according to the auxiliary information, the third information for different usages corresponds to different durations of the measurement gap in the first measurement gap configuration information, in response to that the auxiliary information includes the third information.

In some embodiments, this method further includes: sending activation information for indicating that the first measurement gap configuration information is enabled to the network device, during the validity period: or sending deactivation information for indicating that the first measurement gap configuration information is not enabled to the network device, during the validity period.

Based on the same concept as the above method embodiments, embodiments of the present disclosure further provide a communication apparatus 300 that may have the functions of the user equipment 101 in the above method embodiments and may be configured to perform the steps executed by the user equipment 101 in the above embodiments. The functions may be implemented through hardware, or through software, or through hardware execution of corresponding software. The hardware or software includes one or more modules corresponding to the above functions.

Figure 3:
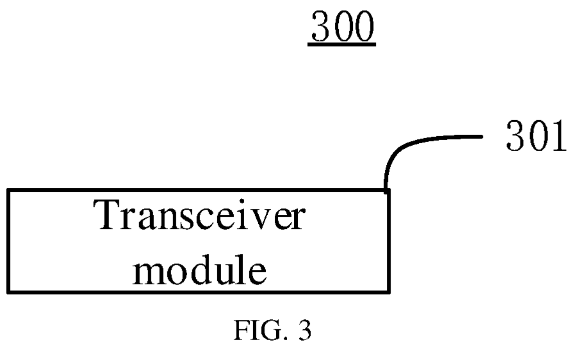
FIG. 3 shows a structural diagram of an apparatus for receiving measurement gap configuration information according to an embodiment of the present disclosure.

In an embodiment, the communication apparatus 300 shown in FIG. 3 may serve as the user equipment 101 in the above method embodiments and perform the steps performed by the user equipment 101 in the above method embodiments. As shown in FIG. 3, the communication apparatus 300 includes a transceiver module 301 configured to support communication of the communication apparatus 300. The transceiver module 302 has wireless communication functions, and for example can communicate wirelessly with other communication apparatuses through wireless ports.

When executing the steps implemented by the user equipment 101, the transceiver module 301 is configured to send the auxiliary information to the network device of the service network. The auxiliary information is configured to indicate at least one parameter for the user equipment to switch from the service network to the target network: and is also configured to receive the first measurement gap configuration information determined by the network device according to the auxiliary information.

Figure 4:
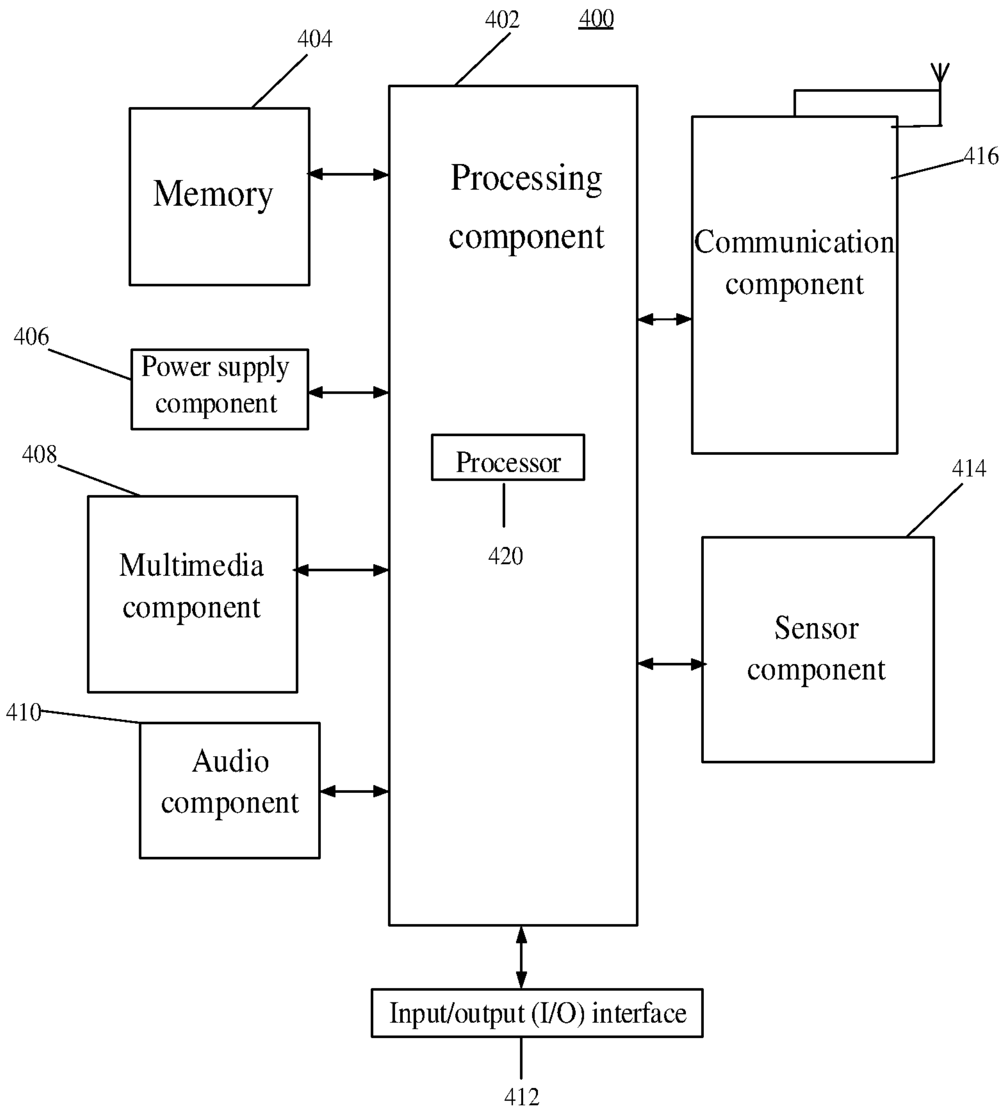
FIG. 4 shows a structural diagram of another apparatus for receiving measurement gap configuration information according to an embodiment of the present disclosure.

When the communication apparatus is the user equipment 101, its structure may also be like an apparatus 400 shown in FIG. 4. The apparatus 400 may be a mobile phone, a computer, a digital broadcast terminal, a messaging device, a game console, a tablet device, a medical device, a fitness device, and a personal digital assistant, etc.

Referring to FIG. 4, the apparatus 400 may include one or more of the following components: a processing component 402, a memory 404, a power supply component 406, a multimedia component 408, an audio component 410, an input/output (I/O) interface 412, a sensor component 414, and a communication component 416.

The processing component 402 typically controls the overall operation of the apparatus 400, such as the operation associated with display, telephone call, data communication, camera operation and recording operation. The processing component 402 may include one or more processors 420 to execute instruction to complete all or part of steps of the method described above. In addition, the processing component 402 may include one or more modules, to facilitate the interaction between the processing component 402 and other components. For example, the processing component

402 may include a multimedia module, to facilitate the interaction between the multimedia component 408 and the processing component 402.

The memory 404 is configured to store various types of data to support the operation of the apparatus 400. Examples of these data include interactions of any applications or methods operated on the apparatus 400, contact data, phonebook data, messages, pictures, videos, etc. The memory 404 can be implemented with any types of volatile or non-volatile memory device, or a combination thereof, such as static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disk.

The power supply component 406 provides power to various components of the apparatus 400. The power supply component 406 may include a power management system, one or more power supplies, and other components associated with generating, managing, and distributing power for the apparatus 400.

The multimedia component 408 includes a screen providing an output interface between the apparatus 400 and a user. In some embodiments, the screen may include a liquid crystal display (LCD) and a touch panel (TP). If the screen includes a touch panel, the screen can be implemented as a touch screen, to receive an input signal from the user. The touch panel includes one or more touch sensors to sense touch, sliding, and a gesture on the touch panel. The touch sensor can not only sense the boundary of a touch or sliding swipe action, but also detect the duration and pressure associated with the touch or sliding action. In some embodiments, the multimedia component 408 includes a front-facing camera and/or a rear-facing camera. When the apparatus 400 is in an operating mode, such as a shooting mode or a video mode, the front-facing camera and/or the rear-facing camera can receive external multimedia data. Each front-facing camera and rear-facing camera can be a fixed optical lens system or have focal length and optical zoom capability.

The audio component 410 is configured to output and/or input an audio signal. For example, the audio component 410 includes a microphone (MIC), and the microphone is configured to receive external audio signal when the apparatus 400 is in an operating mode, such as a call mode, a record mode and a voice recognition mode. The received audio signal may be further stored in memory 404 or be sent via the communication component 416. In some embodiments, the audio component 410 further includes a speaker for outputting the audio signal.

The I/O interface 412 provides an interface between the processing component 402 and a peripheral interface module, and the peripheral interface module may be a keyboard, a clicking wheel, a button and the like. These buttons may include but are not limited to: a home button, a volume button, a start button, and a lock button.

The sensor component 414 includes one or more sensors for providing condition assessment of various aspects for the apparatus 400. For example, the sensor component 414 may detect the open/closed state of the apparatus 400, the relative positioning of the components, for example, the component is a display screen and a keypad of the apparatus 400, and the sensor component 414 may also detect changes in the position of the apparatus 400 or a component of the apparatus 400, the presence or absence of contact between the user and the apparatus 400, the orientation or acceleration/deceleration of the apparatus 400, and the temperature change of the apparatus 400. The sensor component 414 may include a proximity sensor, configured to detect the presence of nearby objects without any physical contact. The sensor component 414 may further include an optical sensor, such as CMOS or CCD image sensors, for use in imaging applications. In some embodiments, the sensor component 414 may further include an acceleration sensor, a gyroscope sensor, a magnetic sensor, a pressure sensor, or a temperature sensor.

The communication component 416 is configured to facilitate wired or wireless communication between the apparatus 400 and other devices. The apparatus 400 is coupled to a wireless network which is based on a communication standard, such as Wi-Fi, 4G, 5G, or a combination thereof. In an embodiment, the communication component 416 receives broadcast signals or broadcast-related information from an external broadcast management system through a broadcast channel. In an embodiment, the communication component 416 also includes a near-field communication (NFC) module, to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the apparatus 400 may be implemented by one or more application-specific integrated circuits (ASIC), digital signal processors (DSP), digital signal processing devices (DSPD), programmable logic devices (PLD), field-programmable gate arrays (FPGA), controllers, microcontrollers, microprocessors, or other electronic components for performing the above method.

Based on the same concept as the above method embodiments, embodiments of the present disclosure further provide a communication apparatus 500 that may have the functions of the network device 102 in the above method embodiments and may be configured to perform the steps executed by the network device 102 in the above method embodiments. The functions may be implemented through hardware, or through software, or through hardware execution of corresponding software. The hardware or software includes one or more modules corresponding to the above functions.

Figure 5:
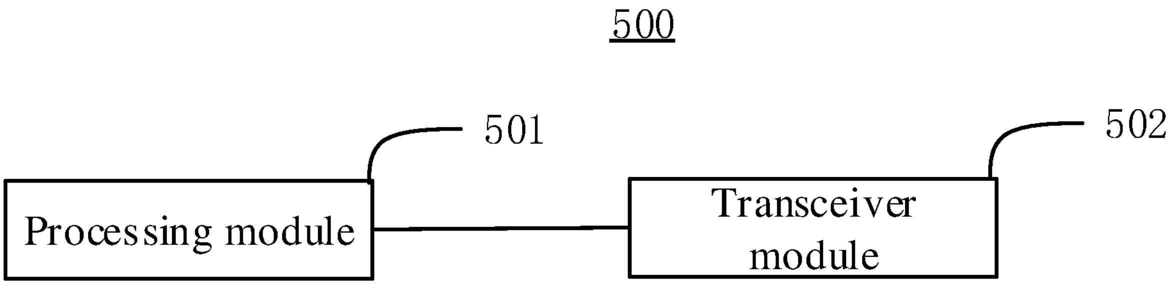
FIG. 5 shows a structural diagram of an apparatus for sending measurement gap configuration information according to an embodiment of the present disclosure.

In an embodiment, the communication apparatus 500 shown in FIG. 5 may serve as the network device 102 in the above method embodiments and perform the steps performed by the network device 102 in the above method embodiments. As shown in FIG. 5, the communication apparatus 500 may include a processing module 501 and a transceiver module 502 coupled to each other. The processing module 501 is configured for the communication apparatus to perform processing operations, such as generating information/messages to be sent, or processing received signals to obtain information/messages. The transceiver module 502 is configured to support communication of the communication apparatus 500, and the transceiver module 502 has wireless communication functions, and for example can communicate wirelessly with other communication apparatuses through wireless ports.

When executing the steps implemented by the network device, the transceiver module 502 is configured to receive the auxiliary information sent by the user equipment, in which the auxiliary information is configured to indicate at least one parameter for the user equipment to switch from the service network to the target network and is further configured to send the first measurement gap configuration information to the user equipment. The processing module 501 is configured to determine the first measurement gap configuration information according to the auxiliary information.

Figure 6:
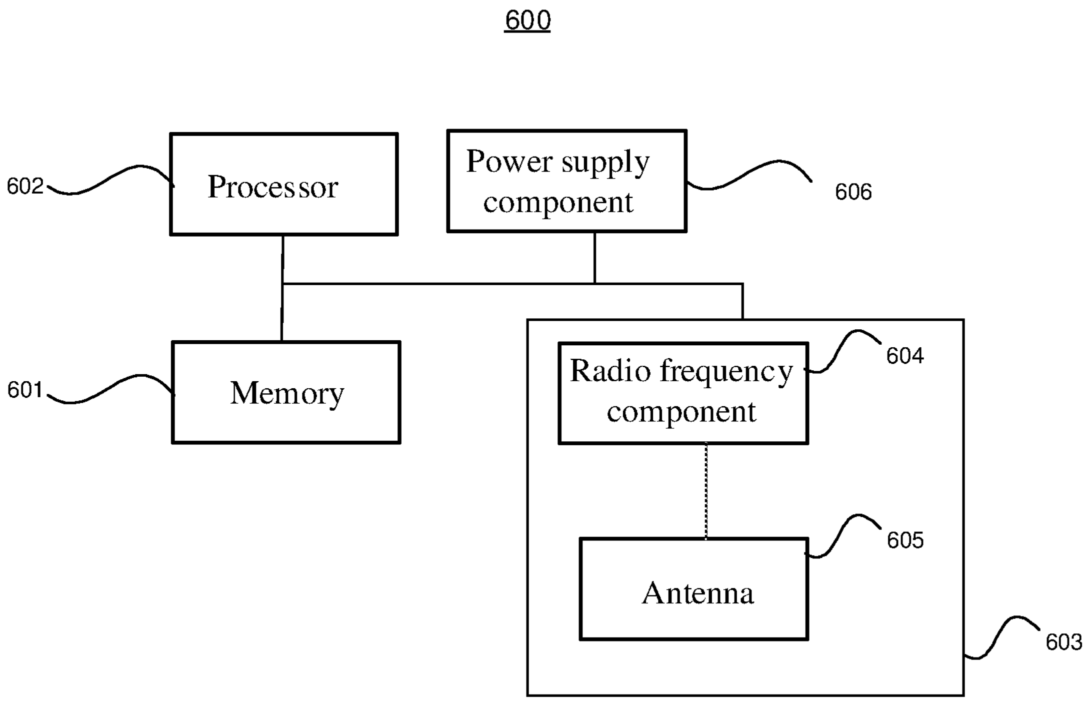
FIG. 6 shows a structural diagram of another apparatus for sending measurement gap configuration information according to an embodiment of the present disclosure.

When the communication apparatus is the network device 102, its structure may also be like an apparatus 600 shown in FIG. 6. A base station is taken as an example to illustrate the structure of the communication apparatus. As shown in FIG. 6, the apparatus 600 includes a memory 601, a processor 602, a transceiver component 603, and a power supply component 606. The memory 601 is coupled to the processor 602 and is configured to store necessary programs and data for the communication apparatus 600 to implement various functions. The processor 602 is configured to support the communication apparatus 600 in executing the corresponding functions in the above method, which may be achieved by calling programs stored in the memory 601. The transceiver component 603 is a wireless transceiver and is configured to support the communication apparatus 600 in receiving signaling and/or data through wireless ports, as well as sending signaling and/or data. The transceiver component 603 is also called a transceiver unit or a communication unit. The transceiver component 603 includes a radio frequency component 604 and one or more antennas 605. The radio frequency component 604 is a remote radio unit (RRU), which is specifically configured to transmit radio frequency signals and convert radio frequency signals to baseband signals. The one or more antennas 605 is specifically configured to radiate and receive radio frequency signals.

When the communication apparatus 600 needs to send data, the processor 602 performs baseband processing on the data to be sent and outputs a baseband signal to the radio frequency unit, and the radio frequency unit processes the baseband signal and sends it in the form of electromagnetic waves through the antenna. When the data is sent to the communication apparatus 600, the radio frequency unit receives the radio frequency signal through the antenna, converts the radio frequency signal into the baseband signal, and outputs the baseband signal to the processor 602, and the processor 602 converts the baseband signal into data and processes the data.

Other embodiments of the present disclosure will be apparent to those skilled in the art after consideration of the specification and practice of the present disclosure. The present disclosure is intended to cover any variations, uses, or adaptations of the embodiments of the present disclosure, which follow the general principles thereof and include undisclosed common knowledge or conventional technical means in the art. The specification and embodiments are merely exemplary and the true scope of the embodiments of the present disclosure is limited by the appended claims.

It should be understood that the embodiments of the present disclosure are not limited to the precise structures as described above and shown in the figures, but can have various modifications and alternations without departing from the scope of the present disclosure. The scope of the embodiments of the present disclosure are limited only by the appended claims.

Industrial Applicability

The user equipment 101 reports relevant parameters for switching from the service network to the target network, and the network device 102 determines the first measurement gap configuration information according to the relevant parameters of the service network switching. According to the first measurement gap configuration information, the network device can indicate the time for measuring the relevant parameters during the switching of the user equipment 101 from the service network to the target network, such that the user equipment 101 may perform relevant parameter measurement and service transmission of the service network at different times, ameliorating the problem of service interruption during the service network switching process.

What is claimed is:

1. A method for receiving measurement gap configuration information, the method being executed by user equipment and the method comprising:

sending auxiliary information and second measurement gap configuration information to a network device of a service network, wherein the auxiliary information is configured to indicate at least one parameter for the user equipment to switch from the service network to a target network, wherein the second measurement gap configuration information comprises configuration of duration of a measurement gap; and receiving first measurement gap configuration information sent by the network device, wherein the first measurement gap configuration information is determined by the network device according to the auxiliary information and the second measurement gap configuration information.

2. The method according to claim 1, wherein sending the auxiliary information to the network device of the service network comprises:

sending a radio resource control signaling to the network device of the service network, wherein the radio resource control signaling comprises the auxiliary information.

3. The method according to claim 1, further comprising:

setting the duration of the measurement gap as a maximum value of a synchronous signal measurement time configuration (SMTC) or a maximum value of a reference signal measurement time configuration (CMTC), in response to the target network being a new radio network; or setting the duration of the measurement gap as duration of a cell reference signal, in response to the target network being a long-term evolution network.

4. The method according to claim 1, wherein the auxiliary information comprises at least one of:

first information indicating a timing difference between a service cell in the service network and a target cell in the target network;

second information indicating a type of a measurement gap, the type being a periodic type or a non-periodic type;

third information indicating a usage of the measurement gap, wherein the usage comprises one of: receiving system information or paging information of the target network, performing cell measurement in the target network, and performing data transmission with the target network; or fourth information indicating a validity period of the measurement gap.

5. The method according to claim 4, wherein a period of the measurement gap in the first measurement gap configuration information is an integer multiple of a maximum value of a SMTC period of a target carrier in the target network or an integer multiple of a maximum value of a CMTC period of the target carrier in the target network, in response to that the auxiliary information comprises the second information and the type indicated by the second information is the periodic type.

6. The method according to claim 4, wherein the third information for different usages corresponds to different durations of the measurement gap in the first measurement gap configuration information, in response to that the auxiliary information comprises the third information.

7. The method according to claim 4, further comprising:

sending activation information for indicating that the first measurement gap configuration information is enabled to the network device, during the validity period; or sending deactivation information for indicating that the first measurement gap configuration information is not enabled to the network device, during the validity period.

8. The method according to claim 1, further comprising:

releasing the first measurement gap configuration information when a timer expires, wherein a start time of the timer is a moment when the first measurement gap configuration information is used for the first time.

9. The method according to claim 1, further comprising:

releasing the first measurement gap configuration information when the number of times the first measurement gap configuration information is used reaches a preset number of times.

10. A method for sending measurement gap configuration information, the method being executed by a network device and the method comprising:

receiving auxiliary information and second measurement gap configuration information sent by user equipment, wherein the auxiliary information is configured to indicate at least one parameter for the user equipment to switch from a service network to a target network, wherein the second measurement gap configuration information comprises configuration of duration of a measurement gap;

determining first measurement gap configuration information according to the auxiliary information and the second measurement gap configuration information; and sending the first measurement gap configuration information to the user equipment.

11. The method according to claim 10, wherein receiving the auxiliary information sent by the user equipment comprises:

receiving a radio resource control signaling, wherein the radio resource control signaling comprises the auxiliary information sent by the user equipment.

12. The method according to claim 10, further comprising:

setting the duration of the measurement gap as a maximum value of a synchronous signal measurement time configuration SMTC or a maximum value of a reference signal measurement time configuration CMTC, in response to the target network being a new radio network; or setting the duration of the measurement gap as duration of a cell reference signal, in response to the target network being a long-term evolution network.

13. The method according to claim 10, wherein the auxiliary information comprises at least one of:

first information indicating a timing difference between a service cell in the service network and a target cell in the target network;

second information indicating a type of a measurement gap, the type being a periodic type or a non-periodic type;

third information indicating a usage of the measurement gap, wherein the usage comprises one of: receiving system information or paging information of the target network, performing cell measurement in the target network, and performing data transmission with the target network; or fourth information indicating a validity period of the measurement gap.

14. The method according to claim 13, wherein determining the first measurement gap configuration information according to the auxiliary information comprises:

determining a period of the measurement gap in the first measurement gap configuration information as an integer multiple of a maximum value of a SMTC period of a target carrier in the target network or as an integer multiple of a maximum value of a CMTC period of the target carrier in the target network, in response to that the auxiliary information comprises the second information and the type indicated by the second information is the periodic type.

15. The method according to claim 13, wherein determining the first measurement gap configuration information according to the auxiliary information comprises:

making the third information for different usages correspond to different durations of the measurement gap in the first measurement gap configuration information, in response to that the auxiliary information comprises the third information.

16. The method according to claim 13, further comprising:

receiving activation information for indicating that the first measurement gap configuration information is enabled from the user equipment, during the validity period; or receiving deactivation information for indicating that the first measurement gap configuration information is not enabled from the user equipment, during the validity period.

17. User equipment, comprising:

a processor; and a memory storing a computer program executable by the processor;

wherein the processor is configured to:

send auxiliary information and second measurement gap configuration information to a network device of a service network, wherein the auxiliary information is configured to indicate at least one parameter for the user equipment to switch from the service network to a target network, wherein the second measurement gap configuration information comprises configuration of duration of a measurement gap; and receive first measurement gap configuration information sent by the network device, wherein the first measurement gap configuration information is determined by the network device according to the auxiliary information and the second measurement gap configuration information.

18. A network device, comprising:

a processor; and a memory storing a computer program executable by the processor; wherein the processor is configured to perform the method according to claim 10.

* * * * *